United States Patent [19]

Slemmons

[11] 4,280,130
[45] Jul. 21, 1981

[54] FORMING DROPLETS FOR INK JET PRINTING

[76] Inventor: Arthur J. Slemmons, 19655 Redberry Dr., Los Gatos, Calif. 95030

[21] Appl. No.: 98,902

[22] Filed: Nov. 13, 1979

[51] Int. Cl.³ ............................................ G01D 15/18
[52] U.S. Cl. ............................... 346/75; 346/140 R
[58] Field of Search .................................. 346/75, 140

[56] References Cited

U.S. PATENT DOCUMENTS

| | | | |
|---|---|---|---|
| 3,586,907 | 6/1971 | Beam | 346/75 X |
| 3,813,675 | 5/1974 | Steffy | 346/75; 346/140 R |
| 3,882,508 | 5/1975 | Stoneburner | 346/75 |
| 4,027,308 | 5/1977 | Fan | 346/75 X |

OTHER PUBLICATIONS

Toupin et al.; Magnetohydrodynamic Velocity Modulation of a Jet; IBM TDB vol. 15, No. 4, Sep. 1972, pp. 1189-1190.

IBM Journal of Research and Development; vol. 21, No. 1, Jan. 1977, pp. 1-80.

Primary Examiner—Joseph W. Hartary
Attorney, Agent, or Firm—C. E. Tripp

[57] ABSTRACT

Ink droplets for ink-jet printing are formed in a conductive, ink by flowing ink having a ion magnetic susceptibility between the poles of a pulsed electro-magnet thereby periodically inducing eddy currents in bodies of the ink which oppose ink flow and stimulate perturbations of an ink stream having an orifice so that discrete droplets of ink are formed at a uniform distance from the orifice.

21 Claims, 10 Drawing Figures

FORMING DROPLETS FOR INK JET PRINTING

FIELD OF THE INVENTION

This invention relates to ink-jet printing, (IJP), and more particularly to an ink drop generating technique for causing discrete ink droplets to break from an ink stream emerging from an ink drop generator nozzle, orifice or orifice plate, with the droplets forming at a regular and uniform distance from their point of ink stream emission from the generator.

DESCRIPTION OF PRIOR ART

The present invention relates solely to droplet formation at an ink droplet generator, other aspects of an ink-jet printing system, embodying the generator of the present invention will not be described in detail.

Before describing the present invention in detail, a few of the more pertinent known factors and techniques will be briefly mentioned. Dot matrix fonts providing at least 100 dots per inch resolution, as compared with multiple nozzle IJP guns are required for high printing speeds.

Attempts have been made to electrostatically form conductive ink into a mist spray of droplets from individual nozzles and then controlling the mist spray in a single oscillating jet or 16 parallel jets have been employed.

In electrostatically generated ink drop printing, the nozzles are supplied with ink at pressure low enough for the surface tension force to prevent ink flow, forming an emiscus at the nozzle tip. A high voltage is applied between the ink and the valving electrode to draw the miniscus into a fine point forming a series of fine drops at the tip of the jet.

The patent to Fan et al U.S. Pat. No. 4,027,308, assigned to the IBM Corporation, discloses the formation of droplets from an ink stream, wherein the ink is magnetic. A pulsating magnetic field is supplied to the magnetic ink stream leaving the nozzle, the field having a substantial extend along the ink stream axis. The nature of the magnetic ink utilized in the aforesaid Fan et al patent is disclosed in U.S. Pat. No. 3,805,252, also assigned to the IBM Corporation and is a stable colloidal suspension in water of 100 A size particles of magnetite with a surfactant surrounding the particles. In the Fan et al patent, after leaving the nozzles, the ink stream passes between at least one opposed pair of electro-magnetic pole pieces having a substantial extent along the stream axis and which are energized by a controlled oscillating frequency to provide a non-uniform magnetic gradient along the stream. Action of the oscillating magnetic fields on the magnetic ink stream produces perturbations in the ink stream, which facilitates breakup of the magnetic ink stream into individual droplets. Fan et al discloses the use of multiple magnetic poles, a single pole or a series of axially spaced wire coils connected in series for producing an electric current and perturbations in the magnetic ink stream, but all forms disclosed require action on a stream of magnetic ink after it has emerged from a nozzle.

The patent to Manning et al U.S. Pat. No. 4,027,309, assigned to the IBM Corporation, employs an elongate exciting crystal for vibrating a long nozzle plate to stimulate the formation of ink droplets from the ink jets emerging from the nozzle plate.

A multiple nozzle or orifice plate ink-jet printer that provides about 100 jets/per inch from the orifice plate is the Mead Corporation Digit Bar Printer. The orifice plate is vibrated by an orifice plate-bending wave generator, causing the plate to assume various standing wave formations along its length. The result is that the streams or filaments from each orifice plate are not all formed into discrete droplets at exactly the same distance from the orifice plate. For long orifice plates, this reduces the accuracy and reliability of the charging electrode plate action on individual droplets passing therethrough. (U.S. patents assigned to the Mead Corporation, Dayton, Ohio, U.S. Pat. Nos. 3,739,393, 3,813,675, 3,882,508 and others assigned to that Corporation).

The previously mentioned patent to Stoneburner U.S. Pat. No. 3,882,508, assigned to the Mead Corporation of Dayton, Ohio, discloses an elongate thin orifice plate for the emission of ink streams, wherein ink droplets are generated by physically vibrating the plate by a wave stimulator which provides resonant standing waves to an orifice plate of a specific shape and construction in an effort to insure droplet formation within a specified range of distances from the orifice plate.

The previously mentioned patent to Stiffey et al U.S. Pat. No. 3,813,675, also assigned to the Mead Corporation, discloses a mechanically vibrated orifice plate and additional details of a charging ring plate and deflection ribbon construction, which additional details can be employed in a system embodying the present invention.

Pages 1189 and 1190 of IBM Technical Disclosure Bulletin Vol. 15, No. 4, September, 1972, by Toupin et al, describes "Magnetohydrodynamic Velocity Modulation of A Jet".

Figure 2:
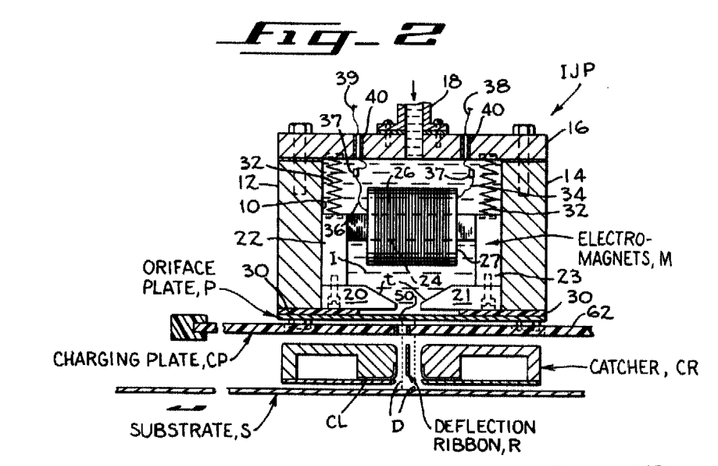
FIG. 2 is a section through the system taken on line 2—2 of FIG. 1.

The most pertinent disclosure therein is that of FIG. 2, which illustrates opposed wound magnetic poles connected to a periodic magnetic field voltage source that periodically generates a magnetic field transversely to the direction of flow of a segmental conducting nozzle 2. The nozzle is formed in two main conductive segments separated by insulators 3. In addition to the magnetic fields, a constant voltage is applied across the conducting nozzle segments 2 for providing a constant voltage electrical field that is at 90° to the magnetic field. This construction is described as "giving a periodic accelerating MHD-force axially along the fluid 5.". Contemplation of this IBM Disclosure Bulletin reveals that in reality what is disclosed in FIG. 2 is a linear electric motor effect acting on spaced slugs or bodies of ink disposed within the nozzle for accelerating or motorizing these slugs and enhancing their tendency to separate from their associated ink filaments and form droplets. One serious problem presented by this constructon is that the orifices of nozzles of this type have an extremely small diameter and a segmented construction of such orifices so as to provide opposed conductors and intervening insulators for each orifice, in order that a constant voltage source can be applied at 90° to the magnetic field, imposes costly technical difficulties. This difficulty is acknowledged in the aforesaid IBM patent to Fan et al U.S. Pat. No. 4,027,308, Col. 1, lines 49-60, and the solution proposed in the patent requires the use of magnetic ink, as described.

The *IBM Journal of Research and Development*, Vol. 21, Nov. 1, 1977, published by International Business Machines Corporation, Armonk, N.Y. (copy attached and referred to as the IBM Journal) describes a number of aspects of ink jet printing, and the information therein is incorporated herein by reference. The article running from pages 2-8 describes an ink jet printing process wherein the drop generator is vibrated at ultrasonic frequency by a piezo crystal and associated electrical driver. The article on pages 10-20 describes a voice-coil actuator and metal bellows unit for perturbing an ink stream. (Page 13).

This mechanical jet break-up process requires careful balance between the fundamental and the harmonic of the mechanically induced perterbations, (beginning on page 19).

The vibration technique raises satellite droplet problems, (page 20). Drop placement errors are unacceptable if accurate charging thereof is to be produced, (page 55). The article on pages 69-74 sets further suitable diamagnetic electrically conductive ink formulations. This article also emphasizes the fact that, "for proper drop charging and deflection, the ink stream must break into drops at a precisely controlled distance from the nozzle" (page 72, second column, "*Stream Properties*"). However, no simple system for precisely and uniformly attaining this result with diamagnetic ink in very long arrays has heretofore been available.

SUMMARY OF THE INVENTION

The ink drop generator of the present invention has, among others, the following advantages and features:

1. The ink droplets formed from one or more ink streams or filaments emitted from the long arrays of orifices or nozzles of the drop generator are formed at uniform and regular distances from their respective points of emission from the generator.

2. The ink stream emitting orifice or nozzle diameters can be very small, in the order of only 50 microns (0.002 inches).

3. The orifices or nozzles which emit the ink streams can be formed as a one-piece, homogenous part, such as a simple elongate thin plate. No conductors and insulators are required at each orifice.

4. The ink stream orifice can be formed as a row on a long orifice plate which need not be physically vibrated as in the Mead Corporation patents, to provide travelling or standing waves in the plate for generation of ink droplets.

5. The ink itself need only be an electric conductor, and need not contain magnetic pigments.

6. The means for breaking up the ink streams emerging ink from the reservoir droplets can be disposed either inside or outside of the ink reservoir. In other words, such break up means can be initiated at either the entry or the exit end of each orifice or nozzle.

7. The electro-magnetic breakup means can be (if desired) electrically energized by a simple alternating current source, as opposed to requiring a uni-directional pulsed current source, as in the aforesaid IBM Bulletin, Vol. 15.

8. The magnetic poles can be elongate so as to straddle a long row of orifices or nozzles and can be shaped to supply a concentrated magnetic field transverse to the flowing ink at the orifices or nozzles.

9. The concentrated magnetic fields can be provided by a row of short electro-magnets in end-to-end relationship and the magnetic fields are rendered uniform along the row of orifices by connecting the individual magnet windings in parallel to the high frequency source of electrical energy.

10. If an elongate orifice plate is employed to provide a row of droplets, such plate need not be straight but can be curved to "wrap around" a curved printed surface.

Briefly, the above features and advantages, as well as other features not specifically mentioned are obtained by periodically retarding the flow of an ink having a low magnetic susceptibility, either just before or just after it leaves a nozzle or orifice. The ink retarding effect is obtained by flowing the ink through and between the poles of a periodically energized electro-magnet which produces a pulsating high frequency magnetic field or flux that extends transversely to the direction of ink flow. The ink is electrically conductive so that when it moves through (transversely to) the periodic magnetic fields, eddy currents are periodically generated in bodies or slugs of the flowing ink within the magnetic fields. The generation of these eddy currents in the ink within the magnetic fields automatically induces forces which oppose ink flow through the fields (Lenz's law) and since the fields are periodically produced (as by an alternating current) the flow of slugs or bodies of ink is periodically retarded. This periodic retardation of the ink slugs introduces perturbations in the ink streams emerging from their respective nozzles or orifices, and the streams assume the shape of uniformly spaced, progressively enlarged segments connected by necked down dilaments. The aforesaid enlargement of retarded segments and necking down of unretarded segments of the ink stream emerging from each orifice or nozzle, results in the rapid production of discrete ink droplets at zones which are uniformly and constantly spaced from the exit end or ends of the associated ink orifices or nozzles. The magnets need not be energized by uni-directional direct current, but can be energized by a much simpler and easily provided alternating current, which may be sinusoidal. Since the ink need not contain magnetic pigments, there is a reduction in the crusting and clogging problems encountered with the inclusion of magnetic pigments in the ink. The magnets and their pole pieces can be placed either inside or externally of the ink reservoir for providing the retarding forces referred to on the ink flowing between the pole pieces. Furthermore, the pole pieces can be formed in an elongate manner so that they straddle a row of orifices in an elongate orifice plate and are shaped (tapered toward the orifices) to apply concentrated magnetic fields or fluxes to ink adjacent said plate. This facilitates use of much longer bar printing techniques as in the aforesaid Mead Corporation patents.

Other features and advantages of the ink drop generator of the present invention will become apparent after the following detailed description of several embodiments thereof.

DETAILED DESCRIPTION OF THE DRAWINGS

Figure 1:
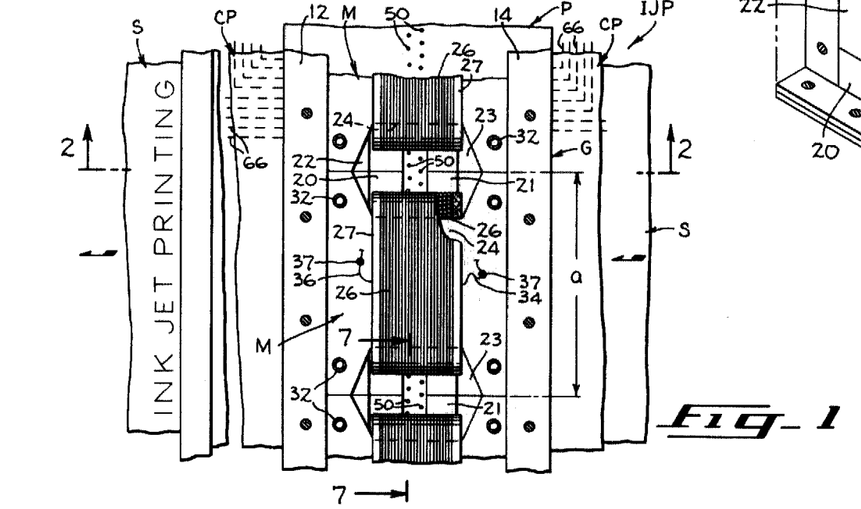
FIG. 1 is a plan of an ink-jet printing system embodying a portion of the droplet generator of the present invention with the reservoir cover plate broken away.

Referring first to FIGS. 1 and 2, an ink-jet printer IJP system is disclosed schematically, and the system selected for illustration of an embodiment of the present invention basically resembles that shown in the Stoneburger U.S. Pat. No. 3,882,508, assigned to the Mead Corporation and mentioned previously. Although the ink droplet generator structure disclosed in this patent, particularly the orifice arrangement of the orifice plate and the system for droplet control will be used as an example of the embodiment of the present invention, it is to be understood that other orifice arrangements and droplet control systems can be employed to incorporate the ink droplet generator principles of the present invention.

The basic components of the ink jet printer IJP include an ink droplet generator G having a reservoir that is filled with ink I, which ink is electrically conductive but has a low magnetic susceptibility, that is, it need not have incorporated therein magnetizable pigments. The generator G in the form now being described, incorporates electromagnets M and the lower face thereof is closed by an elongate orifice plate P having a row of small orifices from which minute streams or filaments of ink I are emitted.

At a carefully selected distance below the orifice plate P is a charging plate, CP which is a non-conducting plate formed with orifices having conductive walls that receive the streams or filaments from the orifice plate P and which is carefully spaced from the orifice plate so that the droplets separate from the streams emerging from the orifice plate P within the confines of the apertures in the charging plate CP. Furthermore, as is well known in the art, computerized means are provided for selectively applying an electric droplet charging potential between the ink emerging from the orifice plate P and the walls of selected orifices in the charging plate CP in order to apply a static electric charge to the formed droplets leaving the charging plate. This charging or noncharging of the droplets is necessary in order to provide the printing control in a manner known in the art and the circuitry and principles of this technique are known, are not critical to the present invention and will not be described.

In the embodiment selected as an example of the present invention, both the orifice plate P and the charging plate CP are provided with two rows of aligned orifices and streams of droplets D are formed in and emerge from the charging plate. These droplet streams, in this embodiment, straddle a charged deflection ribbon R and in the system being described, the selectively non-charged droplets are not affected by the ribbon and continue in thier original path for printing on a moving substrate S.

Having described the general principals and mode of operation of an ink-jet printing IJP system employed as an example, a more detailed description of the droplet generator G will be provided, without reference to minor design or engineering details.

Figure 3:
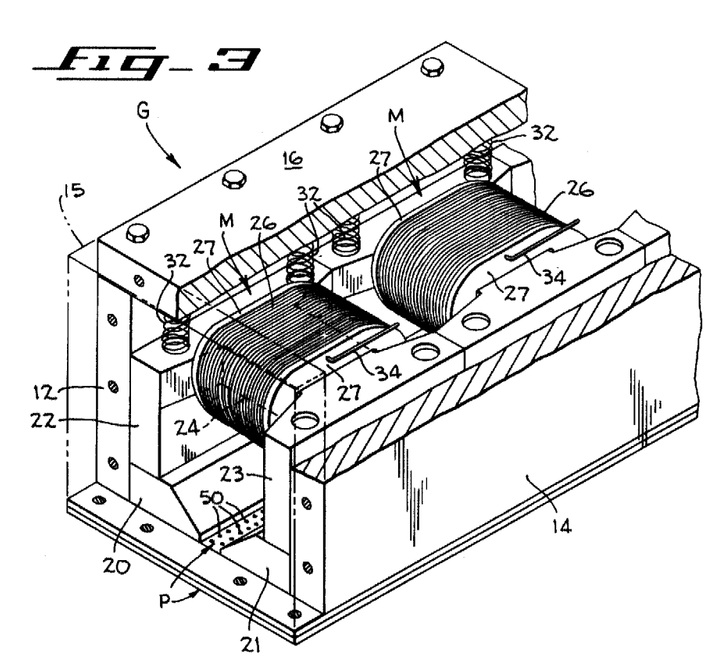
FIG. 3 is a perspective of one end of a first embodiment of a generator embodying the invention.

Referring now to FIGS. 1–3 and as best seen in FIG. 2, the generator G is constructed so as to provide a reservoir 10 for the ink I. The bottom of the reservoir is closed by the orifice plate P.

The electrically conducting ink I is supplied to the reservoir 10 by an inlet line 18 from a supply and a pump (not shown) in the conventional manner. Filters (not shown) can be introduced in the system in a known manner. The ink can be formulated in the manner described on pages 69–74 of the aforesaid IBM Journal. The ink is preferably water based and has dissolved therein a polar substance such as sodium sulfate or preferably an ammonium compound. A soluble dye is also included and some dyes include about 35% of conductive salts and hence will, themselves, render the ink polar. No magnetizable pigments are included nor desired, because these could aggravate "crusting" and flushing problems.

The reservoir 10 has elongate side plates 12, 14 which are at least long enough to span the width of one sheet of paper or substrate S to be printed. End reservoir closure plates, such as plate 15 shown in phantom in FIG. 3 are also provided. The bottom of the reservoir is formed by the orifice plate P and the top thereof is formed by a cover plate 16. Both the orifice plate and the cover plate are secured to the side plates by suitable screws, bolts or other fasteners and any necessary gaskets are employed.

The electrically conducting, ink I is supplied to the reservoir 10 by the inlet 18 from a supply and a pump (not shown) in the conventional manner. A typical pressure, when employing a water base ink would be, as pointed out in the aforesaid Stonberger U.S. Pat. No. 3,882,508, about 690,000 to 800,000 dynes/cm (10 psi--12 psi), although this pressure is not critical. In addition to the inlet line 18, a return line (not shown) is also connected to the cover plate 16 or to any other suitable wall of the reservoir. In accordance with the first form of the invention, the row of electromagnets M is disposed within the reservoir 10 and these magnets have pole pieces 20,21 which produce a strong magnetic field transversely to the direction of flow of ink past the pole pieces. As previously mentioned, this motion of the electrically conducting ink across the periodically generated magnetic fields of the pole pieces induces eddy currents in the flowing ink within the pole pieces which currents periodically oppose flow of the ink. The aforesaid periodic ink flow retardation results in perturbations of the ink filaments or streams leaving the orifice plate P. The pole pieces 20, 21 are tapered toward the orifice plate at "t" in order to concentrate the magnetic flux at the orifice plate. The pole pieces are screwed to opposite side pieces 22,23 of the main body of each electromagnet M.

Bridging the magnet side pieces 22,23 and preferably integral therewith is a necked down core piece 24 which receives the wire winding or coil 26 for supplying electrical energy to the magnet. The pole pieces, side pieces and core of the magnet are formed of ferrite to reduce eddy current losses. The windings 26 are confined by the conventional fiber and washers 27 that also surround the core. By necking down the cores 24, the magnets can be in end-to-end abutment along the orifice plate. In a typical example, each winding 26 will comprise about 200 turns of No. 40 wire.

The system for mounting the magnets M within the reservoir is not critical to the present invention. In the embodiment shown, a row of magnets in end-to-end abutment is provided. The pole pieces 20,21 are pressed against thin insulating or diamagnetic spacers 30 by means of an array of coil springs 32, the ends of which fit into shallow sockets in the cover plate 16 and in the upper surfaces of the magnet side pieces. Magnet side pieces 22,23 slidably rest against the side walls 12, 14 of the reservoir. As seen in FIG. 2, magnet coil wire endings 34,35 (FIGS. 1 and 4) are connected by conventional connectors 37 to leads 38,39, these leads passing through sealed insulating sleeves 40 in the reservoir coverplate 16.

Figure 4:
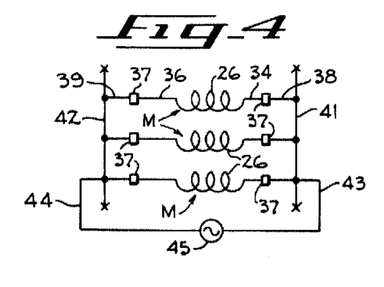
FIG. 4 is a diagram showing the wiring of the electromagnets to an alternating current source.

The coils 26 of the magnets M are periodically energized to produce increasing and collapsing magnetic flux fields across pole pieces 20, 21 of each magnet M. As seen in FIG. 4, the coils 26 of the magnets are connected in parallel across lines 40, 41 and these lines receive alternating current via busses 43, 44 from an AC generator 45. Although a pulsed DC current could be applied to the magnets, one of the features of the present invention is that due to the principle of its mode of operation, a sinusoidal alternating current supply 45, which is economical and simple to provide, is satisfactory. The ultrasonic frequency of the current alternations is not critical, the higher the frequency the greater the number of droplets produced per second. With alternating current, two droplets per cycle are generated. Eddy current power losses in the magnet bodies limit the upper frequency. No satelite drops were observed throughout the excitation frequency range of 5 to 45 KHz.

As shown in FIG. 1, in the embodiment shown the linear or end-to-end dimension of the bodies of each magnet M along the row of orifices in the orifice plate P is indicated by the dimension arrow "a" and in this example this dimension will be about 2.54 cm (1 inch).

DROPLET FORMATION

Figure 5:
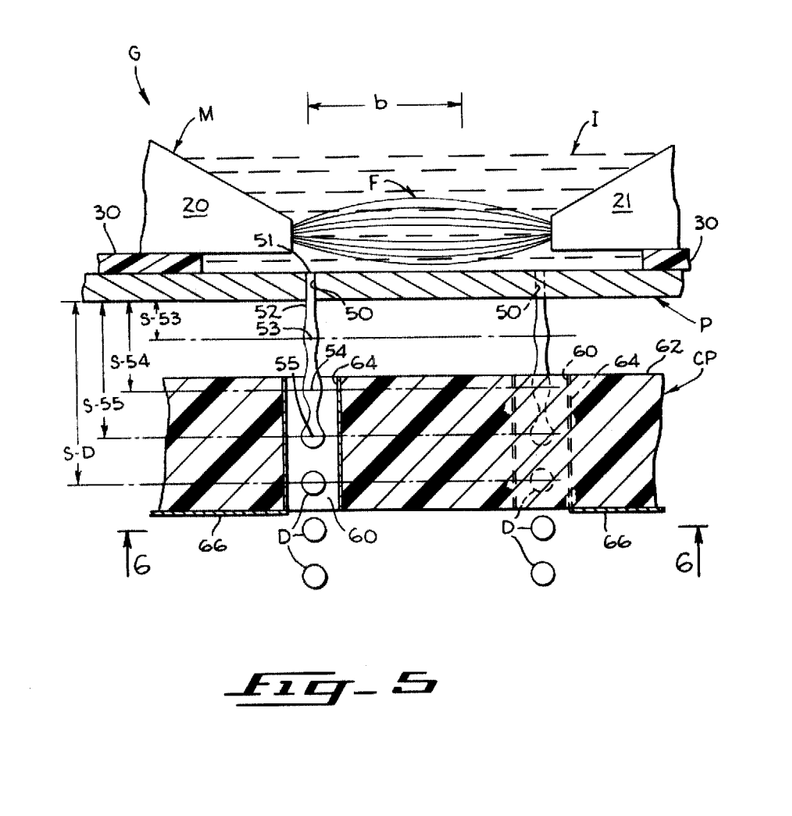
FIG. 5 is a greatly enlarged fragmentary transverse section through a portion of the ink droplet generator and droplet charging plate.
Figure 6:
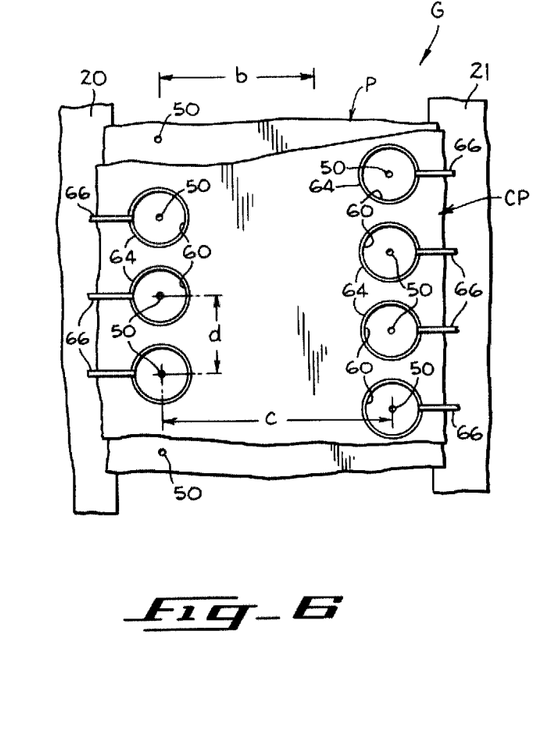
FIG. 6 is a fragmentary bottom view looking up at the charging plate, as indicated by line 6—6 on FIG. 5.
Figure 7:
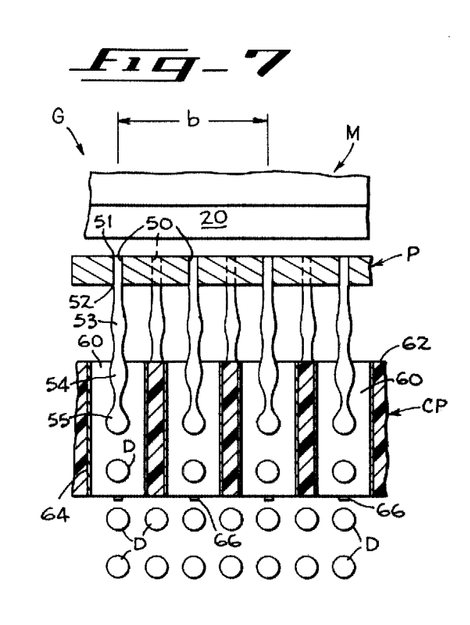
FIG. 7, which is drawn to the same scale as FIGS. 5 and 6, is an enlarged fragmentary section of the generator and charging plate taken on line 7—7 of FIG. 1.

Although FIGS. 1-3 are drawn at an enlarged scale, the orifices formed in orifice plate P are of such a small diameter and are so closely spaced that to illustrate the action at the orifices, FIGS. 5-7 are included, which are drawn to a much larger scale. In fact, the dimension arrow "b" in these figures represents only 1 mm (0.04"). In the form shown, and as described in the aforesaid U.S. Pat. No. 3,882,508, orifices 50 in the orifice plate P have a diameter of about 50 microns (0.002 inches) and have ink entry ends 51 and ink exit ends 52. As best shown in FIG. 6, the orifices 50 are arranged in two rows having a row to row spacing "c" of about 1.5 mm and an orifice spacing "d" within each row of about 0.5 mm.

As previously described, the droplet formation principle of the present invention is that of periodically introducing retarding forces on the flowing, conducting ink I in close proximity to the orifice plate. These periodic retarding forces enchance the inherent Rayleigh instability of the ink streams emerging from their respective orifices and such forces are provided by generating pulsing magnetic fields in planes that are transverse to the direction of flow of the conductive ink. When a polar or conductive ink flows in a direction perpendicular to the plane of a magnetic force field, applicant has found that eddy currents are generated within each body of ink disposed within the magnetic field. It is known (Lenz's law) that eddy currents induced within a portion of a conductor moving through a magnetic field generate a force which opposes motion of the conductor. Thus when the magnetic fields are generated periodically, regular, periodic retarding forces are produced which oppose motion of the conductor through the magnetic fields. As seen in FIGS. 5 and 7, the aforesaid periodic retarding forces on the flowing ink between the magnetic poles cause each filament or stream of ink leaving the orifice plate to periodically swell or enlarge, as at 53,54 and 55 and to neck down between the previously retarded enlargements. This action enhances the inherent Rayleigh instability of the stream or filament and the phenomenon of uniform swelling and necking down of the filament continues until a discrete or separated ink droplet D is soon formed by surface tension. An important advantage of the present invention is that by applying regular, periodic magnetic fields, the spacings (FIG. 5) "S-53", "S-54", S-55" and "S-D" from the orifice plate are respectively equal. As a result, charging plate CP can be positioned relative to the orifice plate P so that the first discrete droplet D is always formed within each orifice 60 of the charging plate, and all first droplets D are formed at substantially the same distance "SD" from that plate. It will be noted that the diameter of each charging plate orifice 60 is greater than that of the droplets D so that they will pass through the charging plate without contacting the orifice walls.

As previously mentioned, an electrostatic charge can be applied to droplets within the charging plate orifices 60 by computer (or other process control system) in a manner known in the art which is not critical to the present invention.

In order to charge droplets, as described, the charging plate CP has a non-conductive body 62 in which the orifices 60 are formed. By means known in the art, the charging plate CP has a non-conductive body 62 in which the orifices 60 are formed. By means known in the art, the walls of the charging plate orifices are lined with or have deposited thereon thin electrically conducting surfaces, layers or walls 64 and each of these walls has connected thereto, by known printed circuit techniques, individual conductors 66, each of which is ultimately connected for selective charging by the computer or other control system employed in the pringing system.

Thus, as explained above, uniformly timed, periodic retarding forces are applied to the flowing conductive ink by relying solely on the eddy currents generated in the flowing ink as it flows through periodically generated magnetic fields. The problem of insuring complete and uniform drop formation within the confines of the charging orifices in the charging plate is thereby solved. The ink need not contain magnetic pigments. No special orifice plate formation or auxiliary electrodes, etc. are required. No mechanical vibration systems are necessary for causing perturbations in the ink streams. The magnetic fields need not be uni-directional, that is, they need not be pulsed by uni-directional or direct current. Although such pulsed currents will provide the desired results, their production is more expensive than that of periodically energizing the magnet windings by an alternating current generator 45, as illustrated in FIG. 4. A uniformly varying magnetic field can be produced along a long row of orifices by providing a plurality of end-to-end electromagnets connected in parallel to their energy source.

EXTERNAL MAGNET FORM

Figure 8:
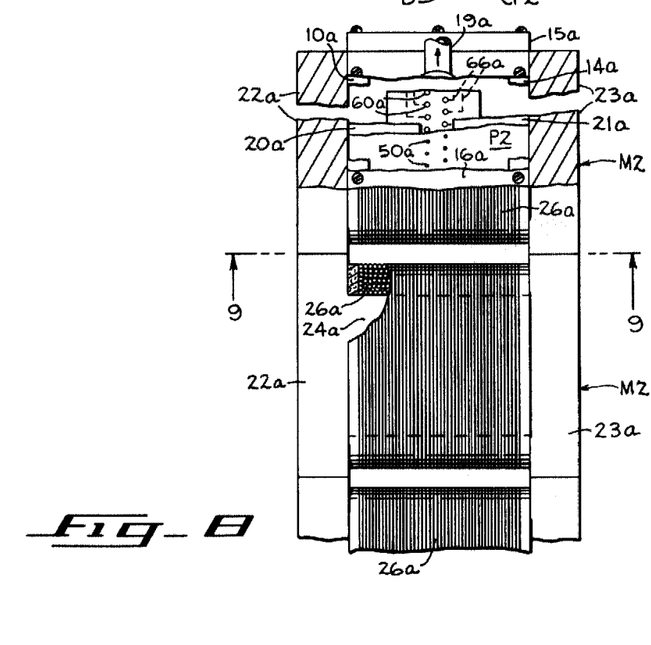
FIG. 8 is a fragmentary plan view of a modified form of an ink generator wherein the magnetic poles are disposed at the exit end of the orifice plate orifices.
Figure 9:
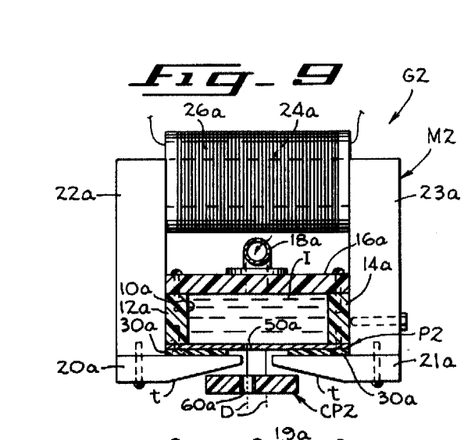
FIG. 9 is a section through the generator and charging plate taken on line 9—9 of FIG. 8.

FIGS. 8 and 9 illustrate a second embodiment of the invention wherein the magnetic pole pieces are disposed at the exit ends of the orifices in the orifice plate instead of the entry ends thereof. In other words, the magnets are external of and surround the ink reservoir instead of being disposed within the ink reservoir. Like parts have the same basic reference characters with the subscripts "a" or "2" added. As best seen in FIG. 9, the magnets M2 of the generator G2 of this embodiment surround the reservoir 10a for the ink I. The pole pieces 20a, 21a of the magnets are in close proximity to the exit or delivery ends of the orifices 50a in the orifice plate P2 and as before, the pole pieces are tapered at "t" toward the orifice plate P2. The pole pieces of the magnets are configured so that the charging plate CP2 can be positioned close enough to the orifice plate P2 so that droplets D are formed within the orifices 60a of the charging plate. The other elements of the embodiment of FIGS. 8 and 9 correspond to and have the same general function as those of the first embodiment and, as mentioned, are given the same reference characters with subscripts, and hence are not described in detail. It is noted that an ink exit conduit 19a for ink circulation through the reservoir 10a appears in FIG. 8 as does an end closure plate 15a for the reservoir. Such an exit conduit (not shown) is employed in the first embodiment. The electrical connections for the magnets M2 are like that shown in FIG. 4.

The periodic, regularly generated magnetic flux fields that bridge the pole pieces 20a, 21a of the form of FIGS. 8 and 9 cause uniform retardation of slugs or bodies of the flowing stream of ink emitted from the orifice plate P2, as in the first embodiment. This periodic ink stream retarding action, resulting from eddy currents periodically generated in the moving streams of conductive ink leaving the orifice plate provide the same regularly spaced droplets D within the orifice 60a of the charging plate CP2, as was illustrated and described in connection with the first embodiment.

THIRD EMBODIMENT

Figure 10:
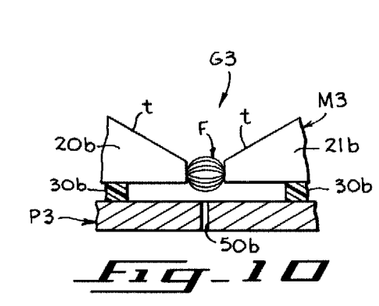
FIG. 10 is a partial fragmentary section through an ink droplet generator like that of FIGS. 1–3 wherein the orifice plate is provided with a single row of ink-jet emitting orifices.

FIG. 10 is a partial fragmentary section through the orifice plate taken between sets of magnet pole pieces 20b, 21b of a row of magnets M3 of a generator G3. This embodiment differs from the previous embodiments in that the orifice plate P3 is provided with a single row of orifices 50b instead of two rows, as previously described. Pole piece spacers 30b are provided, as before. Since in this embodiment, the orifice plate P3 has a single row of orifices 50b formed therein, instead of two rows of orifices as in the embodiments previously described, the pole pieces 20b, 21b of the magnets can generate a magnetic field F across a smaller gap adjacent the orifice plate than in the embodiments previously described. It may be necessary to space the orifices 50b from one another by a slightly greater distance than in the previously described embodiments in order to accommodate adequately sized orifices in the underlying charging plate which is not shown, but this spacing is not critical to the invention and only effects the definition characteristics of the printed characters.

Having described several embodiments of my invention, it can be seen that I insure the formation of droplets from the emerging ink streams at a uniform distance from nozzles or from the orifices in very long orifice plates from which the ink streams emerge and that this is accomplished in a very simple manner based upon taking advantage of Leng's law that eddy currents generated in a conductor moving across or through a magnetic field oppose motion of the conductor. By providing pulsating magnet fields advantage is taken of this phenomenon to stimulate the regular and uniform separation of droplets from an ink stream. In the present invention, the ink need not be loaded with magnetic particles or pigments, but need only be electrically conductive and the eddy currents periodically generated in the body of ink flowing through the pulsing magnetic fields act to periodically locally retard the advance of each ink stream flowing through the magnetic fields. The aforesaid periodic and uniform retardation of the flowing ink insures that the droplets breaking away from the streams or filaments of ink emerging from their respective orifices or nozzles will be formed at a uniform distance from the exit end of each orifice (or nozzle) and thus the droplet charging plate can be positioned to insure that droplets will be charged (or not charged) in accordance with the charging pattern supplied to the charging plate by the conventional control computer, micro-processor or the like.

The uniform and controlled drop formation characteristic of the present invention permits the use of a relatively thin charging plate without losing control of the charging of the emerging discrete droplets. It also facilitates control of the system in that for a given charging plate construction and position, only two major variables need be optimized, namely, the pressure exerted upon the ink in the reservoir and the frequency of the energy supplied to the electromagnets. Variables such as determination of the exact geometric or physical length and width of the orifice plate and the frequency of its mechanical vibration, such as are present in the aforesaid Mead Corporation U.S. Pat. No. 3,882,508 are not present in the system of the present invention. The ends of the magnetic pole pieces can be narrow in the direction of ink flow. This not only concentrates the magnetic flux at the flowing ink but facilitates the construction of an electro-magnet array which can be disposed along a long row of ink emitting orifices. The pole pieces need not have any substantial extent along the axis of the ink filaments because no reliance is placed upon the establishment of a "magnetic gradient" effect, as is essential to the mode of operation in the aforesaid patent to Fan et al U.S. Pat. No. 4,027,308.

Although the best mode contemplated for carrying out the present invention has been herein shown and described, it will be apparent that modification and variation may be made without departing from what is regarded to be the subject matter of the invention as defined in the appended claims.

What is claimed is:

1. Printing head apparatus for producing a jet of small droplets of printing ink, said apparatus being of the type comprising an ink reservoir, means for forming at least one small diameter orifice for said reservoir, means for supplying electrically conductive ink to said reservoir under pressure for forcing an ink stream through each orifice, and electro-magnetic means including opposed pole pieces straddling each orifice for applying a magnetic field to the flowing ink at each orifice; the improvement wherein said ink has a low magnetic susceptibility and said pole pieces are disposed in close proximity to one end of each orifice, means for periodically energizing said electromagnetic means at a high frequency for creating periodically generated eddy currents in said flowing ink at each orifice which eddy currents provide periodic flowing ink retarding forces for perturbing the ink stream emitting from each orifice to stimulate stream ink stream break up into uniformly spaced discrete droplets at a uniform distance from the orifice forming means, said magnetic pole pieces being the sole means for providing electrically generated energy to the flowing ink at said orifice forming means for perturbing the ink stream.

2. The apparatus of claim 1, wherein said electromagnetic means comprises an electro-magnet disposed within said ink reservoir.

3. The apparatus of claim 2, wherein said electromagnet pole pieces are tapered toward said orifice forming means.

4. The apparatus of claim 1, wherein said electromagnetic means comprises an electro-magnet having side pieces that mount said pole pieces with said side pieces connected by a core for electric windings, said electro-magnet being disposed within said ink reservoir with its pole pieces in close proximity to the ink entry end of said orifice.

5. The apparatus of claim 1, wherein said electromagnet energizing means comprises an ultrasonic frequency alternating current generator.

6. The apparatus of claim 1, wherein said electromagnetic means comprises an electro-magnet that surrounds said ink reservoir.

7. The apparatus of claim 1, wherein said electromagnetic means comprises an electro-magnet having side pieces that mount said pole pieces with said side pieces connected by a core for electric windings, said electro-magnet surrounding said reservoir with its pole pieces in close proximity to the ink exit end of said orifice.

8. The apparatus of claim 7, wherein said electromagnet pole pieces are tapered toward said orifice forming means.

9. Printing head apparatus for producing a jet of small droplets of printing ink, said apparatus being of the type comprising an ink reservoir, means for forming at least one small diameter orifice for said reservoir, means for supplying electrically conductive ink to said reservoir under pressure for forcing an ink stream through each orifice, and electro-magnetic means including opposed pole pieces straddling each orifice for applying a magnetic field to the flowing ink at each orifice; the improvement wherein said ink has a low magnetic susceptibility, said orifice forming means comprising an elongate, thin orifice plate having a row of closely spaced orifices, formed therein, said electro-magnetic pole pieces being coextensive with said elongate row of orifices and being disposed at one end of said orifice in close proximity to said orifice plate, means for periodically energizing said electro-magnetic means at a high frequency for creating periodically generated eddy currents in said moving ink, which eddy currents provide periodic flowing ink retarding forces for perturbing the ink streams emitting from all of said orifices to stimulate ink stream break up into uniformly spaced discrete droplets at a uniform distance from said orifice plate, said magnetic pole pieces being the sole means for providing electrically generated energy to the flowing ink at said orifice plate for perturbing the ink streams.

10. The apparatus of claim 9, wherein said electromagnetic means comprises an electro-magnet disposed within said ink reservoir.

11. The apparatus of claim 10, wherein said electromagnet pole pieces are tapered toward said orifice forming means.

12. The apparatus of claim 9, wherein said electromagnetic means comprises an electro-magnet having side pieces that mount said pole pieces with said side pieces connected by a core for electric windings, said electro-magnet being disposed within said ink reservoir with its pole pieces in close proximity to the ink entry end of said orifice.

13. The apparatus of claim 9, wherein said electromagnet energizing means comprises an ultrasonic frequency alternating current generator.

14. The apparatus of claim 9, wherein said elastomagnetic means comprises an electro-magnet that surrounds said ink reservoir.

15. The apparatus of claim 9, wherein said electromagnetic means comprises an electro-magnet having side pieces that mount said pole pieces with said side pieces connected by a core for electric windings, said electro-magnet surrounding said reservoir with its pole pieces in close proximity to the ink exit end of said orifice.

16. The apparatus of claim 15, wherein said electromagnet pole pieces are tapered toward said orifice forming means.

17. Printing head apparatus for producing a jet of small droplets of printing ink for printing on a substrate, said apparatus comprising an elongate ink reservoir having side walls, a top wall and a substrate facing wall, an elongate orifice plate provided with a row of small ink stream orifices, said plate closing the substrate-facing wall of said reservoir, means for supplying electrically conductive ink under pressure to said reservoir, and means for stimulating droplet formations in streams of ink emitted from said orifices; the improvement wherein said ink how a low magnetic susceptibility, said stimulating means comprising a row of electro-magnets; each magnet having opposed pole pieces straddling said row of orifices and in close proximity thereto, side pieces connected to said pole pieces and extending along said reservoir sidewalls, a core piece connecting said side pieces and extending transversely across said reservoir top wall, an electric winding for said core piece; means for connecting the windings of said magnets in parallel and means for supplying a high frequency, pulsating current to said windings.

18. The apparatus of claim 17, wherein the sides of the pole pieces of said row of magnets are in substantial abutment, said core pieces being necked down to provide clearance for the magnet windings.

19. The apparatus of claim 17, wherein said current supplying means is an AC generator.

20. A method for uniformly stimulating the formation of a jet of ink droplets for ink-jet printing; comprising the steps of flowing, electrically conductive ink having a low magnetic susceptibility through a small orifice formed in an ink stream forming device; periodically retarding the flowing ink by subjecting it to regularly pulsed electro-magnetic fields that are transverse to the direction of ink flow and thereby periodically generating electric eddy currents within the body of ink in said magnetic field which retard ink flows and stimulates droplet formation; said electro-magnetic field being the sole source of electrically generated energy applied to the ink for the purpose of stimulating droplet formation.

21. Apparatus for producing a jet of small droplets of liquid, said apparatus being of the type comprising a liquid reservoir, means for forming at least one small diameter orifice for said reservoir, means for supplying electrically conductive liquid to said reservoir under pressure for forcing a liquid stream through each orifice, and electro-magnetic means including opposed pole pieces straddling each orifice for applying a magnetic field to the flowing liquid at each orifice; the improvement wherein said liquid is diamagnetic and said pole pieces are disposed in close proximity to one end of each orifice, means for periodically energizing said electromagnetic means at a high frequency for creating periodically generated eddy currents in said flowing liquid at each orifice which eddy currents provide periodic flowing liquid retarding forces for perturbing the liquid stream emitting from each orifice to stimulate stream liquid stream break up into uniformly spaced discrete droplets at a uniform distance from the orifice forming means, said magnetic pole pieces being the sole means for providing electrically generated energy to the flowing liquid at said orifice forming means for perturbing the liquid stream.

* * * * *